United States Patent
Wu

(10) Patent No.: US 9,393,916 B2
(45) Date of Patent: Jul. 19, 2016

(54) ROTARY ASSEMBLY AND VEHICLE BRACKET USING THE SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Wei-Feng Wu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 60 days.

(21) Appl. No.: 14/549,739

(22) Filed: Nov. 21, 2014

(65) Prior Publication Data
US 2015/0151691 A1 Jun. 4, 2015

(30) Foreign Application Priority Data
Nov. 29, 2013 (CN) .......................... 2013 1 0628418

(51) Int. Cl.
B60R 11/00 (2006.01)
B60R 11/02 (2006.01)

(52) U.S. Cl.
CPC ..... *B60R 11/0241* (2013.01); *B60R 2011/0075* (2013.01); *B60R 2011/0085* (2013.01); *Y10T 16/53888* (2015.01); *Y10T 16/54038* (2015.01)

(58) Field of Classification Search
CPC ..................... B60R 11/0241; B60R 2011/003; B60R 2011/0085; E05D 11/087; E05D 3/02; E05D 11/1057; E05D 16/54; E05D 11/1007; E05D 11/1028; E05D 11/105; E05D 2011/1035; E05D 3/122; Y10T 16/54; Y10T 16/5402; Y10T 16/54024; Y10T 16/540247; Y10T 16/55404; Y10T 16/54044; Y10T 16/54048; Y10T 16/5407; Y10T 16/541
USPC ......................................................... 224/275
See application file for complete search history.

(56) References Cited

U.S. PATENT DOCUMENTS 5,566,424 A * 10/1996 Crompton ............. G06F 1/1601
                                                                 16/337
2007/0084015 A1* 4/2007 Zuo ..................... H04M 1/0216
                                                                 16/354

* cited by examiner

*Primary Examiner* — Adam Waggenspack
(74) *Attorney, Agent, or Firm* — ScienBiziP, P.C.

(57) ABSTRACT

A rotary assembly includes a shaft, a rotary member, a fixing member, a sliding member, and a shank. The shaft defines a latching groove. The rotary member defines a plurality of notched grooves. The fixing member is coupled to the rotary member. The sliding member secures the shaft and the rotary member, the sliding member protruding a resisting block. The shank includes a plurality of teeth. The rotary member passes through the sliding member to rotate around the shaft and the fixing member, the resisting block engages the latching groove, and the plurality of teeth engage the plurality of notched grooves.

17 Claims, 6 Drawing Sheets

ROTARY ASSEMBLY AND VEHICLE BRACKET USING THE SAME

FIELD

The subject matter herein generally relates to rotary assemblies, and particularly to a rotary assembly for connecting a vehicle bracket to a vehicle seat.

BACKGROUND

The use of cellular or other mobile telephones in vehicles are widely used by vehicle operators. The mobile telephones often are merely set on a bracket where they are not securely fastened and an angle of the bracket is not conveniently adjusted.

BRIEF DESCRIPTION OF THE DRAWINGS

Implementations of the present technology will now be described, by way of example only, with reference to the attached figure.

DETAILED DESCRIPTION

Figure 1:
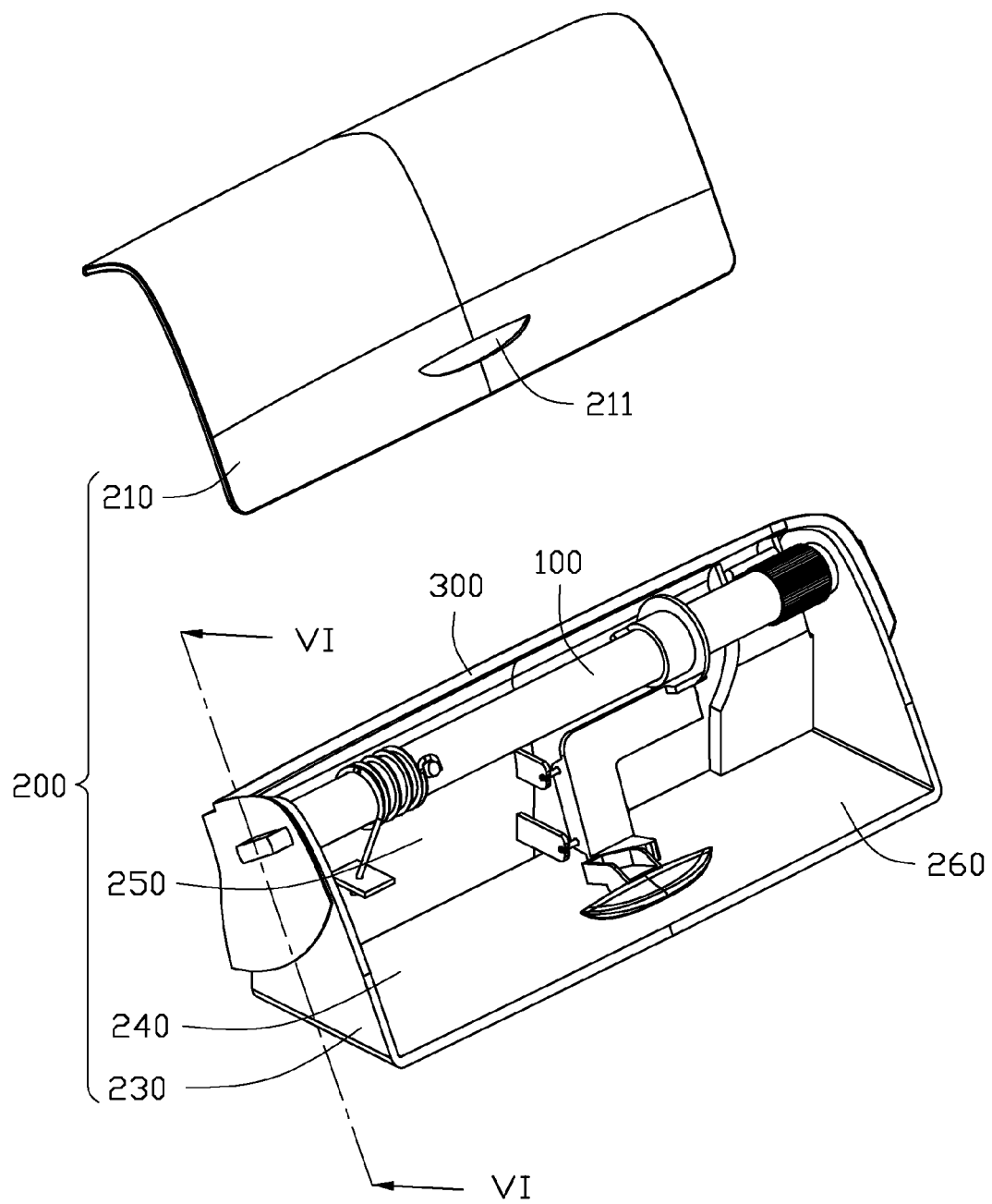
FIG. 1 is a partially exploded, isometric view of a rotary assembly connecting a vehicle bracket to a connecting board, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a rotary assembly and a vehicle bracket using the same.

FIG. 1 illustrates a rotary assembly 100, according an exemplary embodiment. The rotary assembly 100 is mounted on a vehicle bracket 200 to allow the vehicle bracket 200 to be coupled to a connecting board 300.

Figure 2:
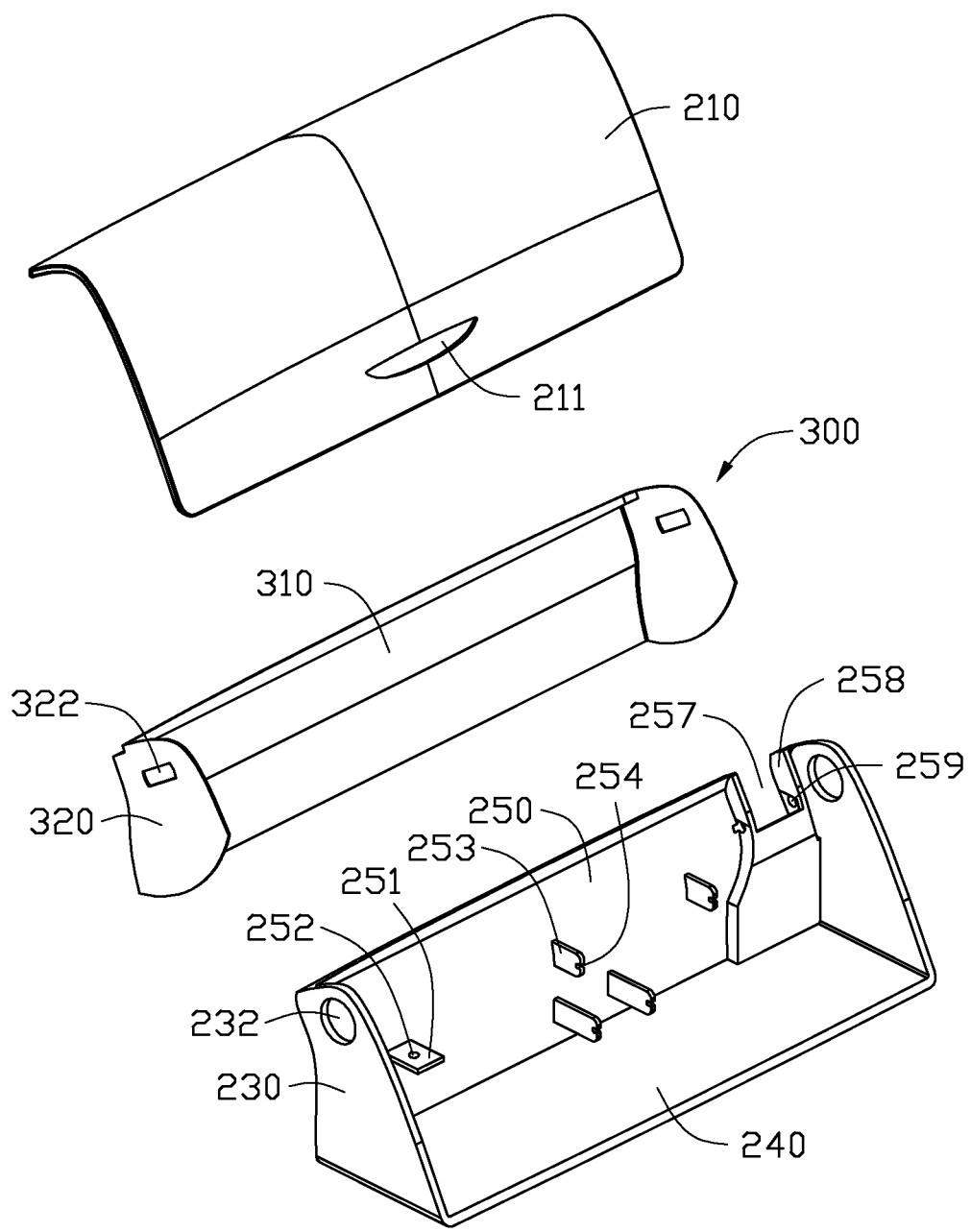
FIG. 2 is an exploded, isometric view of the connecting board and the vehicle bracket of FIG. 1.

Also referring to FIG. 2, the vehicle bracket 200 further includes a cover 210, two side boards 230, a supporting board 240, and a baseboard 250. The supporting board 240 is connected to a side of the baseboard 250, and the two side boards 230 are substantially and perpendicularly connected to two opposite ends of both the supporting board 240 and the baseboard 250. Thus, the baseboard 250, the supporting board 240, and the two side boards 230 cooperatively define an accommodation space 260 for receiving the rotary assembly 100. The cover 210 covers the accommodation space 260 to prevent the rotary assembly 100 from being exposed from the accommodation space 260.

The cover 210 defines a button hole 211, and each side board 230 defines a mounting hole 232 for coupling to the rotary assembly 100. A fixing sheet 251 and a plurality of guiding sheets 253 protrude from the baseboard 250 and extend towards the accommodation space 260. The fixing sheet 251 defines a fixing hole 252, and each guiding sheet 253 defines a guiding groove 254. The baseboard 250 defines an opening 257 adjacent to one of the two side boards 230. Two sidewalls 258 are disposed on two opposite sides of the opening 257, and each sidewall defines a pinhole 259.

The connecting board 300 can be coupled to a vehicle seat, and includes a backplane 310 and two flanges 320 connected at two opposite sides of the backplane 310. Each flange 320 defines a hinge hole 322 for securing the rotary assembly 100.

Figure 3:
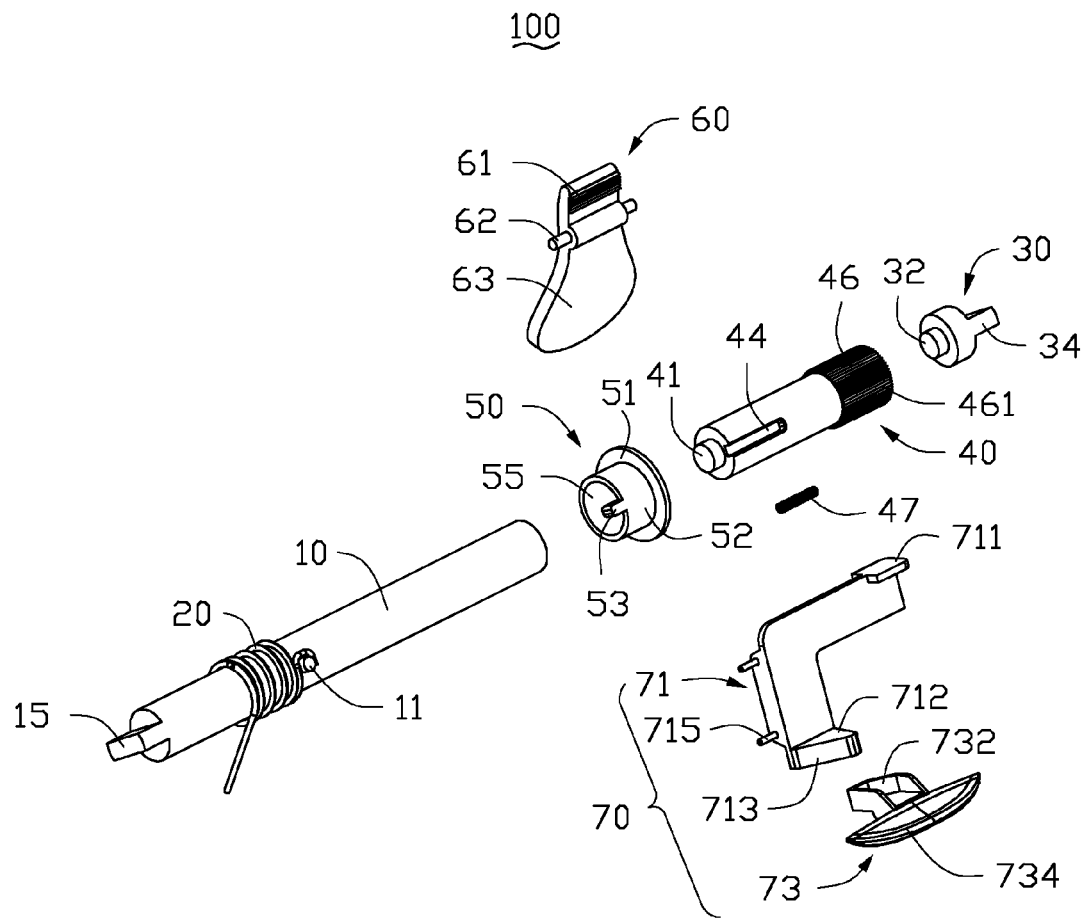
FIG. 3 is an exploded, isometric view of the rotary assembly of FIG. 1.
Figure 4:
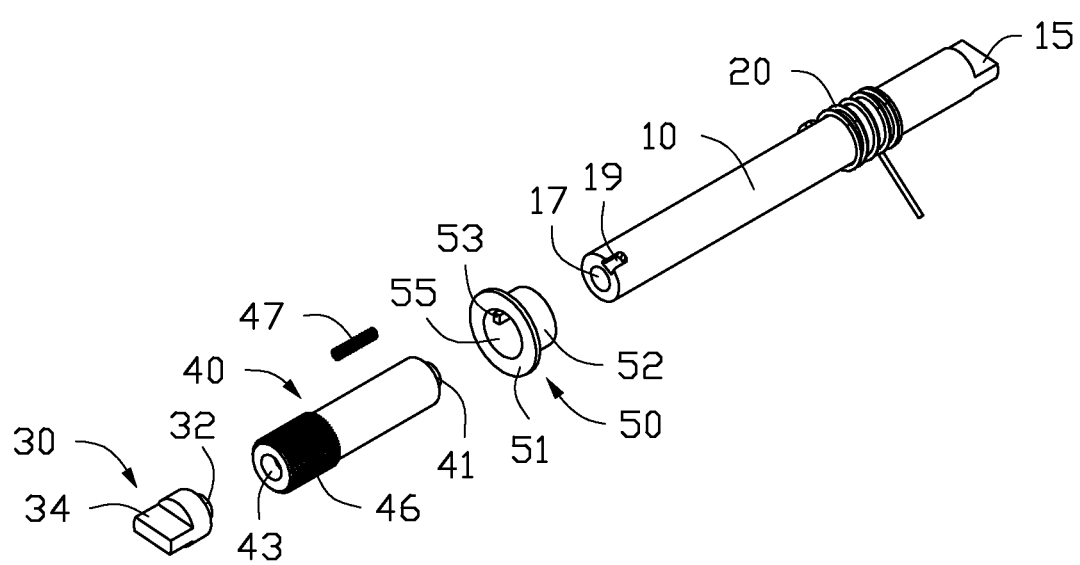
FIG. 4 is a partial, exploded, isometric view of the rotary assembly of FIG. 1.

FIG. 3 and FIG. 4 illustrate the rotary assembly 100 including a shaft 10, a torsion spring 20, a fixing member 30, a rotary member 40, a sliding member 50, a shank 60, and an urging member 70.

The shaft 10 forms a latching post 11 at a middle portion. In addition, a first end of the shaft 10 forms a latching portion 15. The latching portion 15 can be configured to pass through the mounting hole 232 of one side board 230 and be secured in the hinge hole 322 corresponding to the mounting hole 232. A second end of the shaft 10 defines a receiving groove 17 and a latching groove 19 communicating with the receiving groove 17. The receiving groove 17 can be configured to engage the rotary member 40, and the latching groove 19 can be configured to engage the sliding member 50.

The torsion spring 20 is coiled around the shaft 10 to provide potential energy to the vehicle bracket 200. In detail, a first end of the torsion spring 20 is fixed in the fixing hole 252 of the fixing sheet 251, and a second end of the torsion spring 20 is latched on the latching post 11.

The fixing member 30 forms a first protruding post 32 and a flange portion 34 at two opposite ends, respectively. The first protruding post 32 can be coupled to the rotary member 40, and the flange portion 34 can pass through the mounting hole 232 of another side board 230 and be secured in the hinge hole 322 corresponding to the mounting hole 232 of another side board 230.

The rotary member 40 is substantially a cylindrical body, and forms a second protruding post 41 and an accommodation groove 43 at two opposite ends, respectively. The second protruding post 41 can be rotatably received in the receiving groove 17, and the first protruding post 32 can be received in the accommodation groove 43. In addition, the rotary member 40 further defines a latching slot 44 adjacent to the second protruding post 41. A spring 47 is received in the latching slot 44 for urging the sliding member 50. Further, a peripheral wall of the rotary member 40 forms a plurality of latching rings 46, and a notched groove 461 is defined between two adjacent latching rings 46.

The sliding member 50 is configured to secure the shaft 10 and the rotary member 40. In at least one embodiment, the sliding member 50 includes a stopper portion 51 and a barrel 52. The stopper portion 51 is disposed around an end of the barrel 52. The barrel 52 defines an accommodation hole 55 to allow the rotary member 40 to pass through the barrel 52. A resisting block 53 protrudes inwardly from an inner wall of the accommodation hole 55, and extends out of the barrel 52. The resisting block 53 is configured to be latched into the latching slot 44 and resist the spring 47. Additionally, the resisting block 53 can be received in the latching groove 19 to lock the shaft 10 and the rotary member 40.

The shank 60 is rotatably coupled to the vehicle bracket 200, and includes a plurality of teeth 61, a connecting shaft 62, and an operating portion 63. The plurality of teeth 61 are formed on a side of the shank 60. In at least one embodiment, an end of the shank 60 where the plurality of teeth 61 are formed on is substantially arc-shaped to facilitate engagement between the plurality of teeth 61 and the notched grooves 461. The connecting shaft 62 can be rotatably received in the pinhole 259 to allow the shank 60 to be rotatably coupled to the vehicle bracket 200. A user may apply a force to the operating portion 63 to actuate the shank 60.

The urging member 70 includes a connecting portion 71 and a button 73. The connecting portion 71 is substantially L-shaped, a first end of the connection portion 71 forms a pushing block 711 to resist the stopper portion 51, and a second end of the connection portion 71 forms a wedge 712 having an inclined plane 713. A plurality of guide pins 715 are formed on the connecting portion 71 and can slide in the guiding groove 254. The button 73 is slidably mounted on the cover 210. The button 73 includes a resisting plane 732 engaging the inclined plane 713 and a pressing portion 734 received in the button hole 211.

Figure 5:
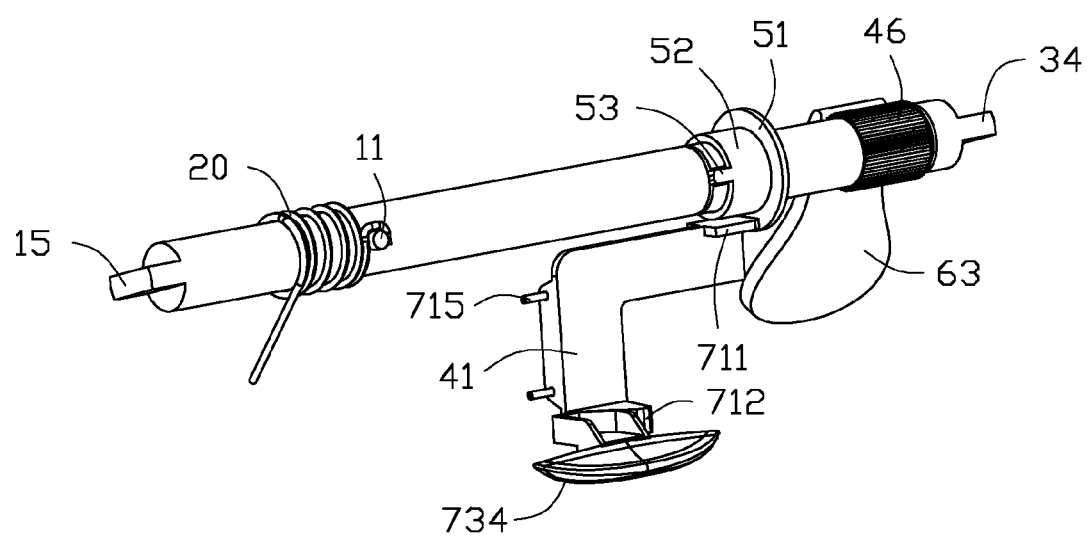
FIG. 5 is an assembled, isometric view of the rotary assembly of FIG. 3.

In assembly, referring to FIG. 5, the latching portion 15 passes through the mounting hole 232 of one side board 230 and is secured in the hinge hole 322 corresponding to the mounting hole 232. The flange portion 34 passes through the mounting hole 232 of another side board 230 and is secured in another hinge hole 322. The first protruding post 32 is received in the accommodation groove 43, and the second protruding post 41 is rotatably received in the receiving groove 17. The sliding member 50 is fitted around an end of the rotary member 40, and then the resisting block 53 resists the spring 47. The resisting block 53 and the spring 47 sliding member 50 and the spring are jointly latched into the latching slot 44. The resisting block 53 resists an end of the shaft 10 near the receiving groove 17 and is not received in the latching groove 19 because of an elastic force of the spring 47. The shank 60 is rotatably received in the pinhole 259 via the connecting shaft 62 to rotatably fix to the vehicle bracket 200. The urging member 70 slides in the guiding groove 254 via the guide pin 715, thereby connecting the connecting portion 71 to the vehicle bracket 200. At this time, the pushing block 711 is coplanar with and spaced from the stopper portion 51. Additionally, the button 73 is slidably mounted on the cover 210, the first end of the torsion spring 20 is fixed in the fixing hole 252 of the fixing sheet 251, and a second end of the torsion spring 20 is latched on the latching post 11. In an initial state, the vehicle bracket 200 is fixed to the connecting board 300 and can be detached from the connecting board 300 by the potential energy of the torsion spring 20.

Figure 6:
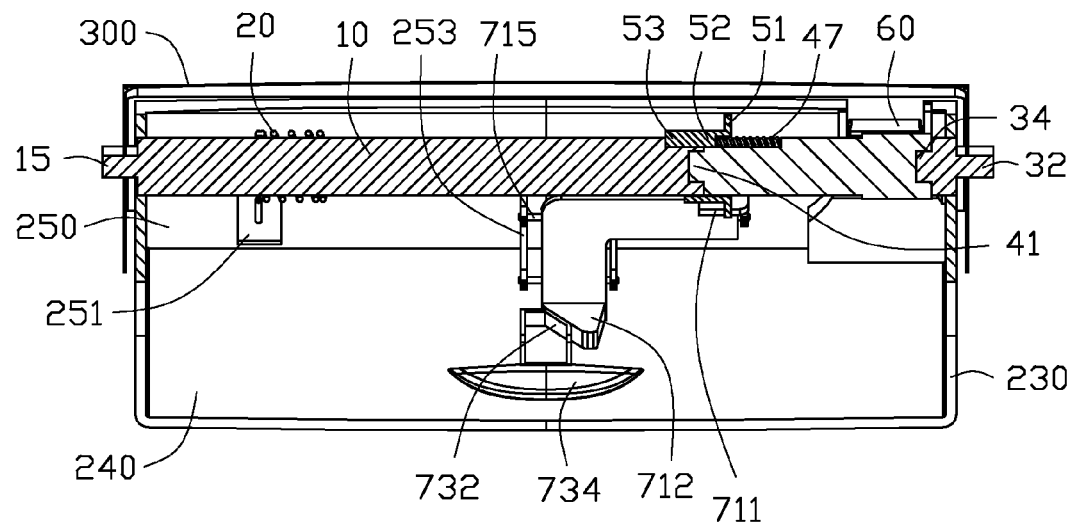
FIG. 6 is a cross-sectional view taken along line VI-VI of FIG. 1.

In use, referring to FIG. 1 and FIG. 6, the plurality of teeth 61 engage the notched grooves 461 by actuating the operating portion 63 to rotate the vehicle bracket 200 and the rotary member 40. When the vehicle bracket 200 is detached from the connecting board 300, the vehicle bracket 200 and the rotary member 40 rotate relative to the shaft 10 and fixing member 30. Since the resisting block 53 resists the spring 47 and are jointly latched into the latching slot 44, the sliding member 50 can continuously rotate with the rotary member 40. When the rotary member 40, the sliding member 50, and the vehicle bracket 200 rotate a first predetermined angle, the resisting block 53 is aligned with the latching groove 19. Due to the elastic force of the spring 47, the resisting block 53 drives the sliding member 50 to slide towards the shaft 10 until the resisting block 53 is received in the latching groove 19. The stopper portion 51 moves towards the pushing block 711 to contact or keep a space with the pushing block 711. At this time, the shaft 10, the rotary member 40, the sliding member 50, and the vehicle bracket 200 are in a locking state. That is, the vehicle bracket 200 cannot rotate.

In order to adjust the angle of the vehicle bracket 200, the plurality of teeth 61 disengage the notched grooves 461 by actuating the operating portion 63. Then, the vehicle bracket 200 is not directed by the rotary member 40 to rotate the vehicle bracket 200 a second adjustment angle. The operating portion 63 can be actuated again to fix the vehicle bracket 200. At this time, the teeth 61 engage the notched grooves 461, and the rotary member 40 and the vehicle bracket 200 are locked again. Thus, mobile telephones or books (not shown) can be securely placed on the vehicle bracket 200.

When the vehicle bracket 200 is not in use, the button 73 is actuated to allow the inclined plane 713 to resist the resisting plane 732. Thus, the connecting portion 71 moves towards the fixing member 30, and then drives the pushing block 71 to move towards the stopper portion 51 until the pushing block 71 resists the stopper portion 51. Thus, the sliding member 50 slides towards the fixing member 30 to allow the resisting block 53 to be disengaged the latching groove 19. At this time, the shaft 10 and the rotary member 40 is a unlocking state, and the vehicle bracket 200 can return the initial state by manually pushing the vehicle bracket 200. In at least one embodiment, a rotational angle of the vehicle bracket 200 is substantially equal to the sum of the first predetermined angle and the second adjustment angle.

When the vehicle bracket 200 is used again, since the vehicle bracket 200 is fixed to the shank 60, the shank 60 latches the rotary member 40, and the rotary member 40 latches the sliding member 50. Thus, the rotary member 40, the sliding member 50, and the vehicle bracket 200 directly rotate a third angle relative to the shaft 10. The third angle is equal to the sum of the first predetermined angle and the second adjustment angle.

In summary, the sliding member 50 engages the shaft 10 through the engagement between the resisting block 53 and the latching groove 19, and the shank 60 latches the rotary member 40 through the engagement between the plurality of teeth 61 and the notched grooves 461. Thus, the vehicle bracket 200 has an angle memory function and can be fixed at a preset angle. Therefore, the rotary assembly 100 is both efficient and convenient.

The embodiments shown and described above are only examples. Many details are often found in the art such as the other features of a rotary assembly and a vehicle bracket using the same. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A rotary assembly comprising:
   a shaft defining a latching groove;
   a rotary member defining a plurality of notched grooves;
   a fixing member coupled to the rotary member;
   a sliding member securing the shaft and the rotary member, the sliding member has a protruding resisting block; and
   a shank comprising a plurality of racks;
   wherein the resisting block engages the latching groove, and the plurality of racks engage the plurality of notched grooves, the rotary member passes through the sliding member to rotate relative to the shaft and the fixing member.

2. The rotary assembly as claimed in claim 1, wherein the fixing member comprises a first protruding post, the rotary member comprises a second protruding post and defines an accommodation groove and a latching slot, the shaft defines a receiving groove, the first protruding post is received in the accommodation groove, the second protruding post is received in the receiving groove, and the resisting block is received in the latching slot.

3. The rotary assembly as claimed in claim 2, wherein a spring is received in the latching slot to urge the resisting block of the sliding member.

4. The rotary assembly as claimed in claim 1, wherein the sliding member further comprises a stopper portion and a barrel, the stopper portion is disposed around an end of the barrel, the barrel defines an accommodation hole to allow the rotary member to pass through the barrel.

5. The rotary assembly as claimed in claim 1, further comprising a torsion spring, wherein the shaft forms a latching post, the torsion spring is coiled around the shaft and latches the latching post.

6. The rotary assembly as claimed in claim 1, further comprising an urging member, wherein the urging member comprises a connecting portion, the connecting portion resists the sliding member.

7. A vehicle bracket comprising:
   a rotary assembly and a baseboard, the rotary assembly comprising:
      a shaft defining a latching groove;
      a rotary member defining a plurality of notched grooves;
      a fixing member coupled to the rotary member;
      a sliding member securing the shaft and the rotary member, the sliding member has a protruding resisting block; and
      a shank rotatably coupled to the baseboard, the shank comprising a plurality of racks;
   wherein the rotary member passes through the sliding member to rotate relative to the shaft and the fixing member, the resisting block engages the latching groove to fix the vehicle bracket at a first predetermined angle, and the plurality of racks engage the plurality of notched grooves to allow the vehicle bracket to rotate a second adjustment angle.

8. The vehicle bracket as claimed in claim 7, wherein the fixing member comprises a first protruding post, the rotary member comprises a second protruding post and defines an accommodation groove and a latching slot, the shaft defines a receiving groove, the first protruding post is received in the accommodation groove, the second protruding post is received in the receiving groove, and the resisting block is received in the latching slot.

9. The vehicle bracket as claimed in claim 8, wherein a spring is received in the latching slot to urge the resisting block of the sliding member.

10. The vehicle bracket as claimed in claim 7, wherein the sliding member further comprises a stopper portion and a barrel, the stopper portion is disposed around an end of the barrel, the barrel defines an accommodation hole to allow the rotary member to pass through the barrel.

11. The vehicle bracket as claimed in claim 7, wherein the rotary assembly further comprises a torsion spring, the shaft forms a latching post, the torsion spring is coiled around the shaft and latches the latching post.

12. The vehicle bracket as claimed in claim 7, wherein the rotary assembly further comprises an urging member and a cover, the urging member comprises a connecting portion and a button, the connecting portion resists the sliding member, and the button is slidably mounted on the cover.

13. The vehicle bracket as claimed in claim 12, wherein the button comprises a resisting plane, and the connection portion has an inclined plane engaging the resisting plane.

14. The vehicle bracket as claimed in claim 7, further comprises two side boards and a supporting board, wherein the supporting board is connected to the baseboard, and the two side boards are substantially and perpendicularly connected to two opposite ends of both the supporting board and the baseboard to form an accommodation space to receive the rotary assembly.

15. The vehicle bracket as claimed in claim 14, wherein the baseboard defines an opening, two sidewalls are disposed on two opposite sides of the opening, and each sidewall defines a pinhole.

16. The vehicle bracket as claimed in claim 15, wherein the shank further comprises a connecting shaft, wherein the connecting shaft is rotatably received in the pinhole.

17. The vehicle bracket as claimed in claim 14, wherein each side board defines a mounting hole, the shaft forms a latching portion passing through one of the two mounting holes, and the fixing member forms a flange portion passing through another mounting hole.

* * * * *